United States Patent
Okuyama et al.

[11] Patent Number: 5,356,843
[45] Date of Patent: Oct. 18, 1994

[54] DIELECTRIC CERAMIC COMPOSITIONS AND DIELECTRIC RESONATORS

[75] Inventors: Kojiro Okuyama, Ikoma; Yoichiro Yokotani, Suita; Koichi Kugimiya, Toyonaka, all of Japan

[73] Assignee: Matsushita Electric Industrial Co., Ltd., Osaka, Japan

[21] Appl. No.: 115,643

[22] Filed: Sep. 3, 1993

[30] Foreign Application Priority Data

Sep. 10, 1992 [JP] Japan .................. 4-241640
Feb. 15, 1993 [JP] Japan .................. 5-025284

[51] Int. Cl.$^5$ ............................................. C04B 35/49
[52] U.S. Cl. ............................ 501/134; 501/136
[58] Field of Search ........................... 501/134, 136

[56] References Cited

U.S. PATENT DOCUMENTS

| | | | |
|---|---|---|---|
| 4,339,543 | 7/1982 | Mage et al. | 501/134 |
| 4,665,041 | 5/1987 | Higuchi et al. | 501/134 |
| 4,968,649 | 11/1990 | Tsurumi et al. | 501/134 |
| 5,019,306 | 5/1991 | Huang et al. | 264/66 |
| 5,077,247 | 12/1991 | Sato et al. | 501/137 |
| 5,128,290 | 7/1992 | Yamada et al. | 501/138 |
| 5,132,258 | 7/1992 | Takahashi et al. | 501/134 |

FOREIGN PATENT DOCUMENTS

| | | | |
|---|---|---|---|
| 60-270644 | 6/1987 | Japan | C04B 35/49 |
| 3151676 | 6/1988 | Japan | C04B 35/49 |
| 2-192460 | 7/1990 | Japan | C04B 35/49 |

OTHER PUBLICATIONS

Lynch, R. W., et al; "Thermal Expansion, Compressibility and Polymorphism in Hafnium and Zirconium Titanates", J. Am. Ceram. Soc., 55 pp. 409–413 (1972).
McHale, A. E. et al; "Low–Temperature Phase Relationships in the System $ZrO_2$–$TiO_2$", J. Am. Ceram. Soc., 69 [11], pp. 827–832 (1986).
Yamamoto, A. et al; "Modulated Structure of Zirconium Titanate", Acta Cryst. (1991) C47, pp. 1588–1591.

*Primary Examiner*—Mark L. Bell
*Assistant Examiner*—Deborah Jones
*Attorney, Agent, or Firm*—Fish & Richardson

[57] ABSTRACT

The invention provides a dielectric ceramic including as the main component a complex oxide formed of both Zr and Ti, at least one component selected from the group (A) consisting of {Mg, Co, Zn, Ni and Mn} and at least one component selected from the group (B) consisting of {Nb and Ta} and a $TE_{01}$ δ-mode dielectric resonator including the dielectric ceramic, and also the invention provides a dielectric ceramic composition expressed by Formula (a):

$$xZrO_2\text{—}yTiO_2\text{—}zA_{(1+w)/3}Nb_{(2-w)/3}O_2 \qquad (a)$$

wherein A denotes at least one component selected from the group (A) consisting of {Mg, Co, Zn, Ni and Mn}, x, y and z denote molar fractions ranging from 0.10 to 0.60, 0.20 to 0.60 and 0.01 to 0.70, respectively, and have the relation represented by Formula (α):

$$x+y+z=1 \qquad (\alpha)$$

and w denotes a value of 0 to 1.50, and a $TE_{01}$ δ-mode dielectric resonator in which using the dielectric ceramic.

3 Claims, No Drawings

DIELECTRIC CERAMIC COMPOSITIONS AND DIELECTRIC RESONATORS

BACKGROUND OF THE INVENTION

1. Field of the Invention

This invention relates to dielectric ceramics and dielectric resonators for use in such high-frequency ranges as microwave and millimeter-wave frequencies.

2. Description of the Prior Art

Recently, dielectric ceramics have been widely used in dielectric resonators and filters in microwave and millimeter-wave frequencies at wavelengths of several centimeters or less (hereinafter referred to as microwave in general). It is required that a dielectric material for use in such applications have a high unloaded Q (Qu) value and dielectric constant $\epsilon_r$, and that the temperature coefficient at resonant frequency $\tau_f$ be variable as desired.

Various materials appropriate for use in such applications have been conventionally reported, among which $ZrTiO_4$ ceramics are included. Also included in such materials are $ZrO_2$—$SnO_2$—$TiO_2$ ceramics, the $ZrO_2$—$SnO_2$—$TiO_2$—$MgO$ ceramic suggested in Japanese Laid-Open Patent No. 62-132769 and the $ZrO_2$—$SnO_2$—$TiO_2$—$CoO$—$Nb_2O_5$ ceramic in No. 2-192460 are known, for example.

However, although $ZrTiO_4$ ceramics have a high dielectric constant of 45, the temperature coefficient at resonant frequency is high in the positive side at 54 ppm/°C., and the temperature coefficient is significantly varied by the heating history during sintering. $ZrO_2$—$SnO_2$—$TiO_2$ ceramic system achieved a low temperature coefficient at resonant frequency nearly zero, but the heating history problems didn't solved satisfactory.

In addition, conventional materials have such problems that the dielectric constant and unloaded Q value are low, and that the temperature coefficient at resonant frequency cannot be varied as desired.

Moreover, although the product of resonant frequency (f)×Qu value is generally regarded as being constant in a given material, when f is lowered (that is, an element is enlarged), actually, the product fQu is reduced (decreased). Therefore, there is a strong demand for a dielectric element for microwave applications such as a dielectric resonator for a base station of mobile radio communication system used in a relatively low frequency range with a higher unloaded Q value. Furthermore, because dielectric resonators used in the relatively low frequency ranges are very bulky, reduction in size is highly demanded.

SUMMARY OF THE INVENTION

The object of the present invention is to provide $ZrTiO_4$ and $ZrO_2$—$SnO_2$—$TiO_2$ dielectric ceramics with less variation of temperature coefficient at their resonant frequency due to heating history during sintering.

It is another object of the invention to provide dielectric ceramics that have a high unloaded Q value and high dielectric constant, and have a temperature coefficient at resonant frequency which is variable as desired.

It is still another object of the invention to provide $TE_{01}\delta$-mode dielectric resonators having a high unloaded Q value in a frequency range of 0.8 to 5 GHz with a compact size.

The subject of the invention is to achieve one of these objects or to achieve more than two objects at the same time.

The invention relates to a dielectric ceramic comprising as the main component a complex oxide formed of both Zr and Ti, at least one component selected from the group (A) consisting of Mg, Co, Zn, Ni and Mn and at least one component selected from the group (B) consisting of Nb and Ta.

The invention also relates to a dielectric ceramic composition expressed by (a):

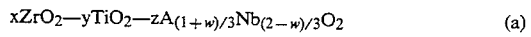  (a)

wherein A denotes at least one component selected from the group (A) consisting of Mg, Co, Zn, Ni and Mn, x, y and z denote molar fractions ranging from 0.10 to 0.60, 0.20 to 0.60 and 0.01 to 0.70, respectively, and have the relation represented by Formula ($\alpha$):

$$x+y+z=1 \qquad (\alpha)$$

and w denotes a value of 0 to 1.50.

The invention also relates to a dielectric ceramic composition expressed by Formula (b):

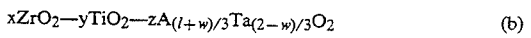  (b)

wherein A denotes at least one component selected from the group (A) consisting of Mg, Co, Zn, Ni and Mn, x, y and z denote molar fractions ranging from 0.10 to 0.60, 0.10 to 0.60 and 0.01 to 0.80, respectively, and have the relation represented by Formula ($\alpha$):

$$x+y+z=1 \qquad (\alpha)$$

and w denotes a value of 0 to 1.00.

The invention also relates to a dielectric ceramic in which the main component comprises a $ZrTiO_4$ phase substituted with at least one component selected from the group (A) consisting of Mg, Co, Zn, Ni and Mn and at least one component selected from the group (B) consisting of Nb and Ta, or the main component crystallographically comprises a $ZrTiO_4$ phase substituted with at least one component selected from the group (A) consisting of Mg, Co, Zn, Ni and Mn and at least one component selected from the group (B) consisting of Nb and Ta.

The invention also relates to a dielectric ceramic in which the main component comprises a $ZrTiO_4$ phase substituted with at least one component selected from the group (A) consisting of Mg, Co, Zn, Ni and Mn and at least one component selected from the group (B) consisting of Nb and Ta, or the main component crystallographically comprises a $ZrTiO_4$ phase substituted with at least one component selected from the group (A) consisting of Mg, Co, Zn, Ni and Mn and at least one component selected from the group (B) consisting of Nb and Ta, wherein the molar fraction ratio of the total amount of the group (A) components to the total amount of the group (B) components ranges from 0.5 to 1.0.

The invention also relates to a $TE_{01}\delta$-mode dielectric resonator comprising a dielectric ceramic which comprises as the main component a complex oxide formed of both Zr and Ti, at least one component selected from the group (A) consisting of Mg, Co, Zn, Ni and Mn and at least one component selected from the group (B) consisting of Nb and Ta.

The invention also relates to a $TE_{01}\delta$-mode dielectric resonator comprising a dielectric ceramic expressed by Formula (a):

$$xZrO_2-yTiO_2-zA_{(1+w)/3}Nb_{(2-w)/3}O_2 \qquad (a)$$

wherein A denotes at least one component selected from the group (A) consisting of Mg, Co, Zn, Ni and Mn, x, y and z denote molar fractions ranging from 0.10 to 0.60, 0.20 to 0.60 and 0.01 to 0.70, respectively, and have the relation represented by Formula ($\alpha$):

$$x+y+z=1 \qquad (\alpha)$$

and w denotes a value of 0 to 1.50.

The invention also relates to a $TE_{01}\delta$-mode dielectric resonator comprising a dielectric ceramic expressed by Formula (b):

$$xZrO_2-yTiO_2-zA_{(1+w)/3}Ta_{(2-w)/3}O_2 \qquad (b)$$

wherein A denotes at least one component selected from the group (A) consisting of Mg, Co, Zn, Ni and Mn, x, y and z denote molar fractions ranging from 0.10 to 0.60, 0.10 to 0.60 and 0.01 to 0.80, respectively, and have the relation represented by Formula ($\alpha$):

$$x+y+z=1 \qquad (\alpha)$$

and w denotes a value of 0 to 1.00.

The invention also relates to a $TE_{01}\delta$-mode dielectric resonator in which the main component comprises a $ZrTiO_4$ phase substituted with at least one component selected from the group (A) consisting of Mg, Co, Zn, Ni and Mn and at least one component selected from the group (B) consisting of Nb and Ta, or the main component crystallographically comprises a $ZrTiO_4$ phase substituted with at least one component selected from the group (A) consisting of Mg, Co, Zn, Ni and Mn and at least one component selected from the group (B) consisting of Nb and Ta.

The invention also relates to a $TE_{01}\delta$-mode dielectric resonator in which the main component comprises a $ZrTiO_4$ phase substituted with at least one component selected from the group (A) consisting of Mg, Co, Zn, Ni and Mn and at least one component selected from the group (B) consisting of Nb and Ta, or the main component crystallographically comprises a $ZrTiO_4$ phase substituted with at least one component selected from the group (A) consisting of Mg, Co, Zn, Ni and Mn and at least one component selected from the group (B) consisting of Nb and Ta, wherein the molar fraction ratio of the total amount of the group (A) components to the total amount of the group (B) components ranges from 0.5 to 1.0.

DETAILED DESCRIPTION OF THE INVENTION

Any compound such as oxide, carbonate, hydroxide, alkoxide of the component elements described above may be used as an initial material of the dielectric ceramic according to the present invention.

As blending methods of powdery raw materials, wet blending for mixing the materials with water or organic solvent in a ball mill and dry blending for mixing them by a mixer or a ball mill, etc. without using any solvent are generally known, and any of these methods may be employed. Alternatively, the alkoxide method and co-precipitation method may be used depending on the initial materials. This means that various known methods applicable to manufacture of dielectric ceramics can be employed. Because the process is thus comparatively uncomplicated, and a homogeneous mixture can be easily obtained, it is desirable to employ the wet blending method for mixing them in a ball mill by using a solvent, and a dispersing agent may be additionally used for increasing the dispersing property of powders, or pH adjustment may be performed.

Although calcination of the mixture is not required, the sintering time can be reduced by calcination. Although the calcination temperature depends on the particular compositions, it is generally in the order of 2 to 8 hrs at about 800° to 1250° C, As milling method of the calcined material or mixture, any such method of using a ball mill, high-speed rotor mill, media agitating mill and jet mill may be employed.

For molding, press molding is generally carried out to obtain a desired shape. Although not specifically limited, pressure used in the press molding is generally in a range of approximately 0.5 to 1.5 ton/cm².

Although the sintering is not specifically limited, as it depends on the particular compositions and dimensions of the moldings, it is generally desirable to perform firing at a temperature of approximately 400° to 700° C. for about 1 to 100 hrs in order to remove binders, then, at approximately 1300° to 1650° C. for about 1 to 10 hrs.

EXAMPLE 1

As initial materials, $ZrO_2$, $TiO_2$, MgO, CoO, ZnO, NiO, $Nb_2O_5$ and $MnCO_3$ of high chemical purity were used, weighed so as to make a predetermined compositions as shown in Table 1 at the end of this specification, and wet-blended with ethanol by using a ball mill. The volume ratio between the powders and ethanol was approximately 2:3. The mixture was removed from the ball mill, dried, and calcined for 2 hours at 1000° C. in the air. The calcination product was wet-milled in the ball mill with ethanol. After the milled slurry was removed from the ball mill and dried, the powders were mixed with 8% by weight of polyvinyl alcohol solution of 6% in concentration added thereto as a binder, homogenized, and granulated by sieving through 32 mesh screen. The granulated powders were molded into a disk of 7 mm in diameter and approximately 3 mm in thickness by using molds and an oil hydraulic press at a molding pressure of 1.3 ton/cm². The molding was placed in a magnesia vessel of high purity, kept in the air at a temperature of 600° C. for 4 hrs to remove binders, then retained in the air at 1500° C. for 24 hrs for sintering, and quenched (taken out of a furnace and air-cooled) or slowly cooled (at a cooling rate of 20° C./hr) thereafter, and dielectric ceramics were obtained.

The resonant frequency was obtained from measurement by the dielectric rod resonator method. The temperature coefficient at resonant frequency $\tau_f$ was obtained in a range between $-25$ and 85° C.

Compositions of dielectric ceramics thus produced are shown in Table 1, and cooling conditions after sintering and temperature coefficients at resonant frequency (ppm/°C.) in Table 2. In Table 1 and Table 2, those with an asterisk are comparison examples.

As recognized from the results shown in Table 2, in dielectric ceramics of sample Nos. 3 to 10 variation of temperature coefficient at resonant frequency due to the heating history during sintering of $ZrTiO_4$ and $ZrO_2$—$SnO_2$—$TiO_2$ ceramics are reduced. In addition, similar effects were confirmed in dielectric ceramics with 0.5mol % of at least one compound of $Al_2O_3$, $SiO_2$, $BaCO_3$, $SrCO_3$, $La_2O_3$ and $Sm_2O_3$ added to those of sample Nos. 3 to 10. Other components may be added as far as the objects of the invention are not adversely affected.

According to the first aspect of the invention, variation of temperature coefficient at resonant frequency due to the heating history during sintering of $ZrTiO_4$ and $ZrO_2$—$SnO_2$—$TiO_2$ ceramics can be reduced.

EXAMPLE 2

As initial materials, $ZrO_2$, $TiO_2$, MgO, CoO, ZnO, NiO, $MnCO_3$ and $Nb_2O_5$ of high chemical purity were used, weighed so as to make a predetermined composition as shown in Table 3, and wet-blended with ethanol by using a ball mill. The volume ratio between the powders and ethanol was approximately 2:3. The mixture was removed from the ball mill, dried, and calcined for 2 to 8 hrs at a temperature of 800° to 1250° C. in the air. The calcination product was wet-milled in the ball mill with ethanol. After the milled slurry was removed from the ball mill and dried, the powders were mixed with 8% by weight of polyvinyl alcohol solution of 6% in concentration added thereto as a binder, homogenized, and granulated by sieving them through 32 mesh screen. The granulated powders were molded into a disk of 7 mm in diameter and approximately 3 mm in thickness by using molds and an oil hydraulic press at a molding pressure of 1.3 ton/cm². The molding was placed in a magnesia vessel of high purity, kept in the air at a temperature of 400° to 700° C. for 4 to 8 hrs to remove binders, and retained thereafter in the air at a temperature of 1300° to 1650° C. for one to 100 hrs for sintering, and dielectric ceramics were obtained. The resonant frequency, unloaded Q (Qu) value and dielectric constant $\epsilon_r$ were obtained by measurement with the dielectric rod resonator method. The temperature coefficient at resonant frequency $\tau_f$ was obtained in a range between −5 and 85° C. The resonant frequency was within a range of 5 to 10 GHz.

The dielectric constants, temperature coefficients at resonant frequency (ppm/°C.) and unloaded Q values obtained in such manner are shown in Table 3. In Table 3, those with an asterisk are comparison examples.

As is obvious from the results shown in Table 3, in dielectric ceramic compositions within a composition range of the second aspect of the invention, the dielectric constant is kept at a high value at microwave frequencies, while a high unloaded Q value is provided.

On the contrary, when x is higher than 0.6, the unloaded Q value is significantly reduced as observed in sample Nos. 54 to 56 (Tables 3-2 and 3—3),and 123 (Table 3-6). In addition, when x is below 0.10, the unloaded Q value is reduced as shown in sample Nos. 60, 61 (Table 3—3) and 126 (Table 3-7), and the objects of the invention cannot readily be achieved.

As recognized in sample Nos. 26 to 29 (Table 3-1) and 116 (Table 3-6), since the unloaded Q value is significantly reduced, when y is higher than 0.60, and the unloaded Q value is excessively low, as seen in sample Nos. 15 to 18 (Table 3-1) and 114 (Table 3-6), when y is below 0.20, the objects of the invention cannot readily be achieved.

When z is higher than 0.70, the unloaded Q value is reduced as observed in sample Nos. 30 to 33 (Table 3-1) and No. 117 (Table 3-6); and the temperature coefficient at resonant frequency is excessively high and the unloaded Q value is significantly reduced as in sample No. 36 (Table 3-2) when z is below 0.01, the objects of the invention cannot readily be achieved. Additionally, although the unloaded Q value can be improved by increasing w to a higher value than 0, however, when w exceeds 1.50, the unloaded Q value is reduced as shown in sample Nos. 93 to 96 (Tables 3-4 and 3-5) and 133 (Table 3-7). However, even in the case of sample No. 133, its properties were better than those of conventional dielectric ceramics.

Incidentally, it was confirmed within the composition range of the example that the unloaded Q value was improved by using A, which is at least one element selected from Mg, Co, Zn, Ni and Mn, and Nb oxide that were calcined beforehand at a temperature of 800° to 1200° C.

Moreover, it was confirmed within the composition range of the example that the degree of sintering was improved by slightly adding an additive, and the properties were not significantly inferior. For example, although the sintering temperature was reduced by approximately 50° C., when 0.08 wt. % of $Al_2O_3$ was added to sample No. 105 (Table 3-5), and was reduced by approximately 25° C., when 0.08 wt. % of $SiO_2$ was added, the properties were not changed significantly in either case. Moreover, even in the case of dielectric ceramic with 0.1 mol % of at least one compound of $BaCO_{b\ 3}$, $SrCO_3$, $La_2O_3$ and $Sm_2O_3$ added thereto, the properties were not significantly changed. Other components may be added as far as the objects of the invention are not adversely affected.

EXAMPLE 3

As initial materials, $ZrO_2$, $TiO_2$, MgO, CoO, ZnO, NiO, $MnCO_3$ and $Ta_2O_5$ of high chemical purity were used, weighed so as to make a predetermined composition as shown in Table 4 and wet-blended with ethanol by using a ball mill. The volume ratio between the powders and ethanol was approximately 2:3. The mixture was removed from the ball mill, dried, and calcined for 2 to 8 hrs at a temperature of 900° to 1250° C. in the air. The calcination product was wet-milled in the ball mill with ethanol. After the milled slurry was removed from the ball mill and dried, the powders were mixed with 8% by weight of polyvinyl alcohol solution of 6% in concentration added thereto as a binder, homogenized, and granulated by sieving through 32 mesh screen. The granulated powders were molded into a disk of 7 mm in diameter and approximately 3 mm in thickness by using molds and an oil hydraulic press at a molding pressure of 1.3 ton/cm². The molding was placed in a magnesia vessel of high purity, kept in the air at a temperature of 400° to 700° C. for 4 to 8 hrs for removing binders, and succeedingly retained in the air at a temperature of 1300° to 1650° C. for 1 to 100 hrs for sintering, and dielectric ceramics were obtained.

The resonant frequency, unloaded Q ( Qu ) value and dielectric constant $\epsilon_r$ were obtained from measurement by the dielectric rod resonator method. The temperature coefficient at resonant frequency $\tau_f$ was obtained in a range between −25° and 85° C. The resonant frequency was within a range of 5 to 10 GHz.

The dielectric constants, temperature coefficients at resonant frequency (ppm/°C.) and unloaded Q values obtained in such manner are shown in Table 4. In Table 4 those with an asterisk are comparison examples outside the range of the invention.

As obviously recognized from a result shown in Table 4, in dielectric ceramic compositions within a composition range of the third aspect of the invention, the dielectric constant is kept at a high value at microwave frequencies, while providing a high unloaded Q value.

Within the composition range of the invention, when x is higher than 0.60, because the unloaded Q value is significantly reduced as shown in sample No. 152 (Table 4-1), the objects of the invention cannot readily be achieved. Also, when x is below 0.10, since the unloaded Q value is reduced as in sample No. 155 (Table 4-2), the objects of the invention cannot easily be fulfilled.

The unloaded Q value is significantly reduced as seen in sample No. 138 (Table 4-1), when y is higher than 0.60; and the unloaded Q value is too low as in sample No. 134 (Table 4-1), when y is below 0.10 as well, the objects of the invention cannot readily be achieved.

The unloaded Q value is reduced as observed in sample No. 139 (Table 4-1), when z is higher than 0.80; and it is significantly reduced as in sample No. 141 (Table 4-1), when z is lower than 0.01, thus, the objects of the invention cannot readily be achieved.

In addition, although the unloaded Q value can be improved by increasing w to a higher value than 0, the objects of the invention cannot be attained, because the unloaded Q value is significantly reduced, when w is higher than 1.00, as recognized in sample No. 168 (Table 4-2).

Incidentally, it was confirmed within the composition range of the example that the unloaded Q value was superior when powdery oxide of A, which is at least one element selected from Mg, Co, Zn, Ni and Mn, and powdery oxide of Ta calcined beforehand at a temperature of 800° to 1200° C. was used.

Moreover, it was confirmed within the composition range of the invention that the degree of sintering could be enhanced by slightly adding an additive, and the properties were not significantly inferior. For example, although the sintering temperature was reduced by approximately 100° C. when 0.08 wt. % of $Al_2O_3$ was added to sample No. 151 (Table 4-1); and it was reduced by approximately 50° C. when 0.08 wt. % of $SiO_2$ was added, the properties were not changed significantly in either case. Furthermore, even in the case of dielectric ceramics with 0.1 mol % of at least one compound of $BaCO_3$, $SrCO_3$, $La_2O_3$ and $Sm_2O_3$ added thereto, the properties were not significantly reduced. Other components may be added as far as the objects of the invention are not adversely affected.

Additionally, a $ZrTiO_4$ phase or one recognized as being crystallographically a $ZrTiO_4$ phase was confirmed by powder X-ray diffraction of a dielectric ceramic within the composition range of Examples 1 to 3 of the invention. It was further confirmed in composition analysis by a local X-ray diffractometer of a fracture surface and polished surface of dielectric ceramic having, as the main component, a $ZrTiO_4$ phase or crystallographically a $ZrTiO_4$ phase that all components of Zr, Ti, A and B wherein A is at least one component selected from the group (A) consisting of Mg, Co, Zn, Ni and Mn, and B is at least one component selected from the group (B) consisting of Nb and Ta, were present in a single grain, and their composition ratio was consistent with the composition ratio between other grains that constitute the main phase in the same dielectric ceramic. It was also confirmed that all components A and B blended were present in a single grain. Moreover, it was confirmed that a dielectric ceramic with components Zr, Ti, A and B present in a single grain showed a higher lattice constant in comparison with a $ZrTiO_4$ ceramic not containing A and B obtained under the same sintering conditions. Accordingly, it was confirmed that components A and B are substituted in the $ZrTiO_4$ phase or the crystallographically $ZrTiO_4$ phase.

Such dielectric ceramic specifically showed a high unloaded Q value, high dielectric constant, and was superior in thermo-stability at resonant frequency, and the unloaded Q value was even higher, when the molar fraction ratio of component A to component B was 0.5 or more and 1.0 or less.

It would be appreciated that dielectric ceramics according to the fourth and fifth aspects of the invention are capable of maintaining the dielectric constant at a high value at microwave frequencies, while providing a high unloaded Q value, and are superior in thermo-stability at resonant frequency.

EXAMPLE 1

As initial materials, $ZrO_2$, $TiO_2$, MgO, CoO, ZnO, NiO, $MnCO_3$ and $Nb_2O_5$ of high chemical purity were used, weighed so as to make a predetermined composition as shown in Table 5, and wet-blended with ethanol by using a ball mill. The volume ratio between the powders and ethanol was approximately 2:3. The mixture was removed from the ball mill, dried, and calcined for 2 to 8 hours at a temperature of 900° to 1250° C. in the air. The calcination product was wet-milled in the ball mill with ethanol. After the milled slurry was removed from the ball mill and dried, the powders were mixed with 10% by weight of polyvinyl alcohol solution of 6% in concentration added thereto as a binder, homogenized, and granulated by sieving them through 32 mesh screen. The granulated powders were molded into cylinders of 16, 35 and 70 mm in diameter by using molds and an oil hydraulic press at a molding pressure of 1 ton/cm². The ratio between diameter and thickness of the molding was arranged to be approximately 2:1. The moldings were placed in a magnesia vessel of high purity, kept in the air at a temperature of 400° to 700° C. for 2 to 100 hrs to remove binders, and then retained in the air at a temperature of 1300° to 1650° C. for 1 to 100 hrs for sintering, and dielectric ceramics were obtained. The dielectric ceramic was placed in the center of a cylindrical cavity made of copper with silver plating (10 μm thick), and a dielectric resonator utilizing $TE_{01}\delta$-mode resonance of the dielectric by electromagnetic wave emitted from an antenna placed in a side surface of the cavity was constructed. The inner dimensions of the cylindrical copper cavity were about four times larger than the diameter and thickness of the dielectric ceramic, respectively, and the thickness was 5 mm. The resonant frequency and Qu value were obtained by measurement with a vector network analyzer. In the case of a molding with a diameter of 16 mm, the resonant frequencies were 2 to 5 GHz, 35 mm, 1 to 2.5 GHz, and 70 mm, 0.6 to 1.5 GHz.

The resonant frequencies (f) and products f×Qu value obtained in such manner are shown in Table 5. In Table 5, those with an asterisk are comparison examples outside the range of the invention.

As evidently seen from a result shown in Table 5, the $TE_{01}\delta$-mode dielectric resonator according to the seventh aspect of the invention has a high unloaded Q value in microwave frequency range and a significantly high unloaded Q value in a relatively low frequency range.

In addition, the volume of dielectric ceramic at resonant frequency of 0.8 GHz is approximately 113 cc in $ZrO_2$—$SnO_2$—$TiO_2$ ceramic ($\epsilon_r$=37.0) and 200 cc in $Ba(Mg_{1/3}Ta_{2/3})O_3$ ceramic ($\epsilon_r$ =24.0), for example, while the volume of sample No. 177 (Table 5-1) of the invention, for example, is about 83 cc. As the volume of $TE_{01}\delta$-mode dielectric resonator corresponds to that of the dielectric ceramic, the $TE_{01}\delta$-mode dielectric resonator according to the seventh aspect of the invention comes to be significantly compact in a relatively low frequency range. Moreover, since the dielectric ceramic is reduced in size and weight as compared with conventional ones, material and manufacturing costs for such a dielectric resonator are reduced.

EXAMPLE 5

As initial materials, $ZrO_2$, $TiO_2$, MgO, CoO, ZnO, NiO, $MnCO_3$ and $Ta_2O_5$ of high chemical purity were used, weighed so as to make a predetermined composition as shown in Table 6 and wet-blended with ethanol by using a ball mill. The volume ratio between the powders and ethanol was approximately 2:3. The mixture was removed from the ball mill, dried, and calcined for 2 to 8 hours at a temperature of 900° to 1250° C. in the air. The calcination product was wet-milled in the ball mill with ethanol. After the milled slurry was removed from the ball mill and dried, the powders were mixed with 8% by weight of polyvinyl alcohol solution of 6% in concentration added thereto as a binder, homogenized, and granulated by sieving them through 32 mesh screen. The granulated powders were molded into disks of 7, 16, 42 and 70 mm in diameter by using molds and an oil hydraulic press at a molding pressure of 1.3 ton/cm². The ratio between diameter and thickness of the molding was arranged to be approximately 2:1. The moldings were placed in a magnesia vessel of high purity, and kept in the air at a temperature of 1300° to 1650° C. for 1 to 100 hrs for sintering, and dielectric ceramics were obtained. The dielectric ceramic was placed in the center of a cylindrical cavity made of copper with silver plating (10 μm thick), and a dielectric resonator utilizing $TE_{01}\delta$-mode resonance of the dielectric by electromagnetic wave emitted from an antenna placed in a side surface of the cavity was constructed. The inner dimensions of the cylindrical copper cavity were about four times larger than the diameter and thickness of the dielectric ceramic, respectively, and the thickness was 5 mm. The resonant frequency and Qu value were obtained by measurement with a vector network analyzer. In the case of a molding with a diameter of 7 mm, the resonant frequencies were 8 to 9 GHz, 16 mm, 3 to 4 GHz, 42 mm, 1 to 2 GHz, and 70 mm, 0.6 to 0.9 GHz .

The values of the resonant frequencies (f) and products f×Qu obtained in such manner are shown in Table 6. In Table 6, those with an asterisk are comparison examples outside the range of the invention.

As is evident from the results shown in Table 6, the $TE_{01}\delta$-mode dielectric resonator according to the eighth aspect of the invention has a high unloaded Q value in microwave frequency range and a significantly high unloaded Q value in a relatively low frequency range.

In addition, the volume of dielectric ceramic at resonant frequency of 0.8 GHz is approximately 113 cc in $ZrO_2$—$SnO_2$—$TiO_2$ ceramic ($\epsilon_r$=37.0), and about 200 cc in $Ba(Mg_{1/3}Ta_{2/3})O_3$ ceramic ($\epsilon_r$=24.0), for example, while the volume of sample No. 211 of the invention, for example, is about 98 cc. As the volume of $TE_{01}\delta$-mode dielectric resonator corresponds to that of dielectric ceramic, the $TE_{01}\delta$-mode dielectric resonator according to the eighth aspect of the invention comes to be significantly compact in a relatively low frequency range. Moreover, since the dielectric ceramic is reduced in size and weight as compared with conventional ones, the material and manufacturing costs of such a dielectric resonator are reduced.

Although a dielectric ceramic of cylindrical shape is used in Examples 4 and 5, it is not limited to such shape, and it was confirmed by the inventors that the $TE_{01}\delta$-mode dielectric resonator having an equivalent or higher unloaded Q value can be constructed by using, for example, an annular dielectric ceramic as well.

As shown in Example 1, because a dielectric ceramic having, as the main component, a complex oxide formed of Zr, Ti, at least one component selected from the group (A) consisting of Mg, Co, Zn, Ni and Mn and at least one component selected from the group (B) consisting of Nb and Ta reduces variation of temperature coefficient at resonant frequency due to the heating history during sintering of $ZrTiO_4$ and $ZrO_2$—$SnO_2$—$TiO_2$ ceramics, the $TE_{01}\delta$-mode dielectric resonator comprising such dielectric ceramic, that is, the $TE_{01}\delta$-mode dielectric resonator according to the sixth aspect of the invention is useful.

Also, the existence of the $ZrTiO_4$ phase or crystallographically $ZrTiO_4$ phase was confirmed by powder X-ray diffraction in the dielectric ceramics of Examples 1 to 5 of the invention. Moreover, it was confirmed in composition analysis by a local X-ray diffractometer of a fracture surface and polished surface of dielectric ceramic having, as the main component, $ZrTiO_4$ phase or crystallographically $ZrTiO_4$ phase that all components Zr, Ti, A and B, wherein A is at least one component selected from the group (A) consisting of Mg, Co, Zn, Ni and Mn, and B is at least one component selected from the group (B) consisting of Nb and Ta, were present in a single grain, and their composition ratio agreed with that of other grains that constitute the main phase in the same dielectric ceramic. It was also confirmed that all components A and B blended were present in a single grain. It was further confirmed that a dielectric ceramic with components Zr, Ti, A and B present in a single grain showed a higher lattice constant in comparison with $ZrTiO_4$ ceramic obtained in the same sintering condition. Accordingly, it was confirmed that components A and B are substituted in the $ZrTiO_4$ phase or crystallographically $ZrTiO_4$ phase.

Such dielectric ceramic specifically showed a high unloaded Q value and high dielectric constant, and was superior in thermo-stability at resonant frequency, and the unloaded Q value was even higher, when the A:B molar fraction ratio was 0.5 or more and 1.0 or less. In other words, the $TE_{01}\delta$-mode dielectric resonators according to the ninth and tenth aspects of the invention have a high unloaded Q value, while maintaining the dielectric constant at a high value at microwave frequencies, and are superior in thermo-stability at resonant frequency.

Especially, in the dielectric ceramic compositions according to the invention, above all sample Nos. 43 to 53, 62 to 92, 97 to 113 and 112 are specifically superior as compositions in which the dielectric constant and unloaded Q value are high, the temperature coefficient at resonant frequency is low, and niobium which is less expensive than tantalum is used. In addition, as dielectric resonators, sample Nos. 117, 180, 183, 186 to 188, 194 and 195 are particularly superior in such aspect that niobium which costs less than tantalum is used.

According to the dielectric ceramic of the invention, variation of temperature coefficient at resonant frequency due to heat history during sintering of $ZrTiO_4$ and $ZrO_2$—$SnO_2$—$TiO_2$ ceramics can be reduced, a high unloaded Q value is provided, and the temperature coefficient at resonant frequency can be changed as desired without reducing the dielectric constant. In other words, a dielectric ceramic having the temperature coefficient of desired value can be obtained by changing the content of the components of dielectric ceramic composition.

Furthermore, according to the structure of the $TE_{01\delta}$-mode dielectric resonator of the invention, a dielectric resonator having a high unloaded Q value in a frequency range of 0.8 to 5 GHz with a compact size can be achieved.

TABLE 1

| Sample NO. | Composition (molar fraction) | | | | | | | | | |
|---|---|---|---|---|---|---|---|---|---|---|
| | Zr | Ti | Mg | Co | Zn | Ni | Mn | Nb | Ta | Sn |
| *1, *2 | 0.50 | 0.50 | 0 | 0 | 0 | 0 | 0 | 0 | 0 | 0 |
| 3, 4 | 0.35 | 0.50 | 0.05 | 0 | 0 | 0 | 0 | 0.10 | 0 | 0 |
| 5, 6 | 0.35 | 0.50 | 0 | 0.05 | 0 | 0 | 0 | 0.10 | 0 | 0 |
| 7, 8 | 0.35 | 0.50 | 0.01 | 0.01 | 0.01 | 0.01 | 0.01 | 0.10 | 0 | 0 |
| 9, 10 | 0.35 | 0.50 | 0.01 | 0.01 | 0.01 | 0.01 | 0.01 | 0.05 | 0.05 | 0 |
| *11, *12 | 0.40 | 0.50 | 0 | 0 | 0 | 0 | 0 | 0 | 0 | 0.10 |
| *13, *14 | 0.32 | 0.50 | 0 | 0.03 | 0 | 0 | 0 | 0.05 | 0 | 0.10 |

TABLE 2

| Sample No. | Cooling condition after sintering | $\tau_f$ (ppm/°C.) |
|---|---|---|
| *1 | Quenching | 53.7 |
| *2 | Slow cooling | 64.3 |
| 3 | Quenching | 3.5 |
| 4 | Slow cooling | 3.8 |
| 5 | Quenching | 5.2 |
| 6 | Slow cooling | 3.9 |
| 7 | Quenching | 4.9 |
| 8 | Slow cooling | 4.8 |
| 9 | Quenching | 0.5 |
| 10 | Slow cooling | 0.9 |
| *11 | Quenching | −8.7 |
| *12 | Slow cooling | 1.2 |
| *13 | Quenching | −24.5 |
| *14 | Slow cooling | −16.3 |

TABLE 3-1

| Sample No. | Composition (molar fraction) | | | | (Value) | | | |
|---|---|---|---|---|---|---|---|---|
| | A | x | y | z | w | εr | τf | Qu |
| *15 | Mg | 0.400 | 0.150 | 0.450 | 0 | 30.2 | −85.2 | 950 |
| *16 | Co | 0.400 | 0.150 | 0.450 | 0 | 29.8 | −70.5 | 850 |
| *17 | Zn | 0.400 | 0.150 | 0.450 | 0 | 30.0 | −88.6 | 980 |
| *18 | Ni | 0.400 | 0.150 | 0.450 | 0 | 30.5 | −69.5 | 850 |
| 19 | Mg | 0.200 | 0.200 | 0.600 | 0 | 30.0 | −48.5 | 9000 |
| 20 | Co | 0.200 | 0.200 | 0.600 | 0 | 28.6 | −35.6 | 9300 |
| 21 | Ni | 0.200 | 0.200 | 0.600 | 0 | 28.0 | −30.8 | 8200 |
| 22 | Mg | 0.450 | 0.200 | 0.350 | 0 | 31.8 | −50.0 | 5200 |
| 23 | Co | 0.450 | 0.200 | 0.350 | 0 | 32.6 | −28.9 | 5700 |

TABLE 3-1-continued

| Sample No. | Composition (molar fraction) | | | | (Value) | | | |
|---|---|---|---|---|---|---|---|---|
| | A | x | y | z | w | εr | τf | Qu |
| 24 | Mg | 0.200 | 0.600 | 0.200 | 0 | 57.5 | 47.5 | 5500 |
| 25 | Zn | 0.200 | 0.600 | 0.200 | 0 | 55.5 | 40.0 | 6200 |
| *26 | Mg | 0.150 | 0.700 | 0.150 | 0 | 74.5 | 189.5 | 520 |
| *27 | Co | 0.150 | 0.700 | 0.150 | 0 | 98.8 | 255.6 | 210 |
| *28 | Zn | 0.150 | 0.700 | 0.150 | 0 | 71.5 | 162.6 | 630 |
| *29 | Ni | 0.150 | 0.700 | 0.150 | 0 | 75.5 | 320.6 | 190 |
| *30 | Mg | 0.150 | 0.120 | 0.730 | 0 | 28.0 | −85.0 | 1200 |
| *31 | Co | 0.150 | 0.120 | 0.730 | 0 | 24.5 | −65.8 | 1000 |
| *32 | Zn | 0.150 | 0.120 | 0.730 | 0 | 26.9 | −88.9 | 800 |
| *33 | Ni | 0.150 | 0.120 | 0.730 | 0 | 23.6 | −56.7 | 900 |
| 34 | Mg | 0.100 | 0.200 | 0.700 | 0 | 33.8 | −8.5 | 9800 |

TABLE 3-2

| Sample No. | Composition (molar fraction) | | | | (Value) | | | |
|---|---|---|---|---|---|---|---|---|
| | A | x | y | z | w | εr | τf | Qu |
| 35 | Ni | 0.100 | 0.200 | 0.700 | 0 | 26.8 | −5.6 | 9500 |
| *36 | | 0.550 | 0.450 | 0 | 0 | 45.8 | 250.8 | 1800 |
| 37 | Mg | 0.490 | 0.500 | 0.010 | 0 | 44.5 | 42.5 | 3800 |
| 38 | Co | 0.490 | 0.500 | 0.010 | 0 | 44.3 | 42.0 | 3600 |
| 39 | Zn | 0.490 | 0.500 | 0.010 | 0 | 43.8 | 45.9 | 3300 |
| 40 | Ni | 0.490 | 0.500 | 0.010 | 0 | 44.5 | 46.5 | 3400 |
| 41 | Mg | 0.300 | 0.300 | 0.400 | 0 | 37.5 | −32.0 | 7000 |
| 42 | Co | 0.300 | 0.300 | 0.400 | 0 | 38.6 | −20.3 | 5600 |
| 43 | Mg | 0.400 | 0.400 | 0.200 | 0 | 42.0 | 0 | 9600 |
| 44 | Co | 0.400 | 0.400 | 0.200 | 0 | 43.2 | 12.6 | 8500 |
| 45 | Zn | 0.400 | 0.400 | 0.200 | 0 | 42.0 | −5.9 | 8900 |
| 46 | Mg | 0.340 | 0.520 | 0.140 | 0 | 42.6 | 5.5 | 7500 |
| 47 | Co | 0.340 | 0.520 | 0.140 | 0 | 44.3 | 8.3 | 5600 |
| 48 | Zn | 0.340 | 0.520 | 0.140 | 0 | 42.9 | −3.6 | 7400 |
| 49 | Ni | 0.340 | 0.520 | 0.140 | 0 | 42.4 | 13.9 | 4800 |
| 50 | Mg | 0.450 | 0.450 | 0.100 | 0 | 41.0 | 6.5 | 5200 |
| 51 | Co | 0.450 | 0.450 | 0.100 | 0 | 42.6 | 9.8 | 4900 |
| 52 | Mg | 0.400 | 0.500 | 0.100 | 0 | 41.4 | −1.2 | 8600 |
| 53 | Co | 0.400 | 0.500 | 0.100 | 0 | 43.5 | −3.6 | 9300 |
| *54 | Mg | 0.650 | 0.200 | 0.100 | 0 | 35.8 | 59.7 | 1400 |

TABLE 3-3

| Sample No. | Composition (molar fraction) | | | | (Value) | | | |
|---|---|---|---|---|---|---|---|---|
| | A | x | y | z | w | εr | τf | Qu |
| *55 | Co | 0.650 | 0.200 | 0.100 | 0 | 29.6 | 21.3 | 580 |
| *56 | Zn | 0.650 | 0.200 | 0.100 | 0 | 23.2 | 36.5 | 860 |
| 57 | Mg | 0.600 | 0.300 | 0.100 | 0 | 40.2 | 45.7 | 4800 |
| 58 | Mg | 0.100 | 0.400 | 0.500 | 0 | 64.5 | 49.8 | 4000 |
| 59 | Ni | 0.100 | 0.400 | 0.500 | 0 | 53.6 | 48.6 | 4500 |
| *60 | Mg | 0.050 | 0.500 | 0.450 | 0 | 82.9 | 153.2 | 980 |
| *61 | Co | 0.050 | 0.500 | 0.450 | 0 | 86.9 | 213.5 | 230 |
| 62 | Mg | 0.450 | 0.350 | 0.200 | 0 | 41.5 | −9.8 | 4900 |
| 63 | Zn | 0.450 | 0.350 | 0.200 | 0 | 41.3 | −21.3 | 5200 |
| 64 | Ni | 0.450 | 0.350 | 0.200 | 0 | 42.5 | −3.9 | 4900 |
| 65 | Mg | 0.350 | 0.450 | 0.200 | 0 | 43.5 | 12.5 | 6000 |
| 66 | Co | 0.350 | 0.450 | 0.200 | 0 | 45.6 | 26.9 | 5100 |
| 67 | Zn | 0.350 | 0.450 | 0.200 | 0 | 42.5 | 3.6 | 5800 |
| 68 | Ni | 0.350 | 0.450 | 0.200 | 0 | 42.9 | 30.6 | 4800 |
| 69 | Mg | 0.350 | 0.450 | 0.200 | 0.01 | 43.5 | 12.5 | 6350 |
| 70 | Co | 0.350 | 0.450 | 0.200 | 0.01 | 45.6 | 26.9 | 5300 |
| 71 | Zn | 0.350 | 0.450 | 0.200 | 0.01 | 42.5 | 3.6 | 5900 |
| 72 | Ni | 0.350 | 0.450 | 0.200 | 0.01 | 42.9 | 30.6 | 5100 |

TABLE 3-3-continued

| Sample No. | A | Composition (molar fraction) x | y | z | (Value) w | $\epsilon r$ | $\tau f$ | Qu |
|---|---|---|---|---|---|---|---|---|
| 73 | Mg | 0.350 | 0.450 | 0.200 | 0.05 | 43.1 | 10.8 | 6700 |
| 74 | Co | 0.350 | 0.450 | 0.200 | 0.05 | 45.1 | 22.6 | 5600 |

TABLE 3-4

| Sample No. | A | Composition (molar fraction) x | y | z | (Value) w | $\epsilon r$ | $\tau f$ | Qu |
|---|---|---|---|---|---|---|---|---|
| 75 | Zn | 0.350 | 0.450 | 0.200 | 0.05 | 41.9 | 2.8 | 6200 |
| 76 | Ni | 0.350 | 0.450 | 0.200 | 0.05 | 41.6 | 25.8 | 5500 |
| 77 | Mg | 0.350 | 0.450 | 0.200 | 0.20 | 42.6 | 7.5 | 6800 |
| 78 | Co | 0.350 | 0.450 | 0.200 | 0.20 | 44.0 | 20.3 | 5900 |
| 79 | Zn | 0.350 | 0.450 | 0.200 | 0.20 | 40.3 | 1.8 | 6500 |
| 80 | Ni | 0.350 | 0.450 | 0.200 | 0.20 | 41.2 | 18.6 | 5700 |
| 81 | Mg | 0.350 | 0.450 | 0.200 | 0.50 | 42.3 | 1.2 | 8020 |
| 82 | Co | 0.350 | 0.450 | 0.200 | 0.50 | 42.3 | 11.9 | 6300 |
| 83 | Zn | 0.350 | 0.450 | 0.200 | 0.50 | 38.0 | -1.3 | 6600 |
| 84 | Ni | 0.350 | 0.450 | 0.200 | 0.50 | 40.2 | 13.5 | 5900 |
| 85 | Mg | 0.350 | 0.450 | 0.200 | 1.00 | 39.8 | -3.5 | 7200 |
| 86 | Co | 0.350 | 0.450 | 0.200 | 1.00 | 39.0 | 5.3 | 7100 |
| 87 | Zn | 0.350 | 0.450 | 0.200 | 1.00 | 35.0 | -5.8 | 7300 |
| 88 | Ni | 0.350 | 0.450 | 0.200 | 1.00 | 36.7 | 4.8 | 6300 |
| 89 | Mg | 0.350 | 0.450 | 0.200 | 1.50 | 37.4 | -6.8 | 6400 |
| 90 | Co | 0.350 | 0.450 | 0.200 | 1.50 | 36.5 | 3.2 | 6900 |
| 91 | Zn | 0.350 | 0.450 | 0.200 | 1.50 | 32.1 | -9.8 | 7200 |
| 92 | Ni | 0.350 | 0.450 | 0.200 | 1.50 | 32.6 | 0.9 | 6000 |
| *93 | Mg | 0.350 | 0.450 | 0.200 | 1.80 | 33.5 | -12.2 | 1350 |
| *94 | Co | 0.350 | 0.450 | 0.200 | 1.80 | 32.6 | -5.6 | 1200 |

TABLE 3-5

| Sample No. | A | Composition (molar fraction) x | y | z | (Value) w | $\epsilon r$ | $\tau f$ | Qu |
|---|---|---|---|---|---|---|---|---|
| *95 | Zn | 0.350 | 0.450 | 0.200 | 1.80 | 29.6 | -15.6 | 1400 |
| *96 | Ni | 0.350 | 0.450 | 0.200 | 1.80 | 29.6 | -5.9 | 850 |
| 97 | $Mg_{1/2}Co_{1/2}$ | 0.340 | 0.520 | 0.140 | 0 | 43.8 | 6.1 | 6900 |
| 98 | $Mg_{1/2}Co_{1/2}$ | 0.340 | 0.520 | 0.140 | 0 | 43.4 | 5.7 | 7200 |
| 99 | $Mg_{1/2}Zn_{1/2}$ | 0.340 | 0.520 | 0.140 | 0 | 42.8 | 0.5 | 7200 |
| 100 | $Mg_{1/3}Co_{1/3}Ni_{1/3}$ | 0.340 | 0.520 | 0.140 | 0 | 42.9 | 8.5 | 6900 |
| 101 | $Mg_{1/4}Co_{1/4}Zn_{1/4}Ni_{1/4}$ | 0.340 | 0.520 | 0.140 | 0 | 43.0 | 12.0 | 5900 |
| 102 | $Mg_{1/2}Co_{1/2}$ | 0.340 | 0.520 | 0.140 | 1.00 | 43.2 | 2.6 | 7100 |
| 103 | $Mg_{1/3}Co_{1/3}Ni_{1/3}$ | 0.340 | 0.520 | 0.140 | 1.00 | 40.5 | 5.2 | 7600 |
| 104 | $Mg_{1/4}Co_{1/4}Zn_{1/4}Ni_{1/4}$ | 0.340 | 0.520 | 0.140 | 1.00 | 41.2 | 2.6 | 6800 |
| 105 | $Mg_{39/40}Mn_{1/40}$ | 0.340 | 0.520 | 0.140 | 0.02 | 42.7 | 5.4 | 8500 |
| 106 | $Mg_{443/500}Mn_{57/500}$ | 0.338 | 0.517 | 0.145 | 0.08 | 42.6 | 5.4 | 8300 |
| 107 | $Mg_{361/500}Mn_{139/500}$ | 0.334 | 0.511 | 0.155 | 0.23 | 42.5 | 5.3 | 8200 |
| 108 | $Mg_{113/200}Mn_{87/200}$ | 0.328 | 0.502 | 0.170 | 0.41 | 42.4 | 5.1 | 7900 |

TABLE 3-6

| Sample No. | A | Composition (molar fraction) x | y | z | (Value) w | $\epsilon r$ | $\tau f$ | Qu |
|---|---|---|---|---|---|---|---|---|
| 109 | $Co_{487/500}Mn_{13/500}$ | 0.340 | 0.519 | 0.141 | 0.02 | 44.2 | 8.1 | 6400 |
| 110 | $Zn_{487/500}Mn_{13/500}$ | 0.340 | 0.519 | 0.141 | 0.02 | 42.5 | -3.5 | 8100 |
| 111 | $Ni_{487/500}Mn_{13/500}$ | 0.340 | 0.519 | 0.141 | 0.02 | 42.3 | 9.8 | 6200 |
| 112 | $Mg_{1983/2000}Mn_{17/2000}$ | 0.350 | 0.449 | 0.201 | 1.01 | 39.8 | -3.8 | 7600 |
| 113 | $Co_{1983/2000}Mn_{17/2000}$ | 0.350 | 0.449 | 0.201 | 1.01 | 39.2 | 5.0 | 7500 |
| *114 | Mn | 0.400 | 0.050 | 0.550 | 0 | 27.5 | -50.2 | 320 |
| 115 | Mn | 0.200 | 0.600 | 0.200 | 0 | 60.4 | 49.5 | 3200 |
| *116 | Mn | 0.150 | 0.700 | 0.150 | 0 | 78.3 | 210.9 | 280 |
| *117 | Mn | 0.100 | 0.080 | 0.820 | 0 | 20.9 | -52.3 | 1200 |
| 118 | Mn | 0.490 | 0.500 | 0.010 | 0 | 44.7 | 44.5 | 3500 |
| 119 | Mn | 0.350 | 0.350 | 0.300 | 0 | 34.8 | -23.8 | 4800 |
| 120 | Mn | 0.400 | 0.400 | 0.200 | 0 | 37.3 | -9.8 | 4700 |
| 121 | Mn | 0.300 | 0.500 | 0.200 | 0 | 46.4 | 20.5 | 4500 |
| 122 | Mn | 0.400 | 0.500 | 0.100 | 0 | 43.8 | 0.9 | 6300 |
| *123 | Mn | 0.650 | 0.250 | 0.100 | 0 | 30.4 | -15.6 | 360 |
| 124 | Mn | 0.600 | 0.300 | 0.100 | 0 | 33.1 | 4.3 | 4500 |

TABLE 3-7

| Sample No. | A | Composition (molar fraction) x | y | z | (Value) w | $\epsilon r$ | $\tau f$ | Qu |
|---|---|---|---|---|---|---|---|---|
| 125 | Mn | 0.100 | 0.400 | 0.500 | 0 | 48.7 | 48.6 | 3600 |
| *126 | Mn | 0.050 | 0.450 | 0.500 | 0 | 75.2 | 183.2 | 240 |
| 127 | Mn | 0.450 | 0.350 | 0.200 | 0 | 35.5 | -15.6 | 3900 |
| 128 | Mn | 0.330 | 0.470 | 0.200 | 0 | 43.5 | 3.5 | 5300 |
| 129 | Mn | 0.330 | 0.470 | 0.200 | 0.01 | 43.5 | 3.5 | 5500 |
| 130 | Mn | 0.330 | 0.470 | 0.200 | 0.10 | 43.5 | 3.4 | 5500 |

TABLE 3-7-continued

| Sample No. | A | Composition (molar fraction) | | | (Value) | | | |
|---|---|---|---|---|---|---|---|---|
| | | x | y | z | w | εr | τf | Qu |
| 131 | Mn | 0.330 | 0.470 | 0.200 | 0.50 | 43.8 | 3.9 | 5800 |
| 132 | Mn | 0.330 | 0.470 | 0.200 | 1.00 | 43.9 | 3.9 | 6000 |
| 133 | Mn | 0.330 | 0.470 | 0.200 | 2.00 | 45.1 | 5.2 | 5000 |

TABLE 4-1

| Sample No. | A | Composition (molar fraction) | | | (Value) | | | |
|---|---|---|---|---|---|---|---|---|
| | | x | y | z | w | εr | τf | Qu |
| *134 | Mg | 0.400 | 0.050 | 0.550 | 0 | 29.8 | −77.5 | 950 |
| 135 | Mg | 0.300 | 0.100 | 0.600 | 0 | 31.0 | −48.5 | 7500 |
| 136 | Mg | 0.500 | 0.100 | 0.400 | 0 | 30.2 | −43.5 | 6400 |
| 137 | Mg | 0.200 | 0.600 | 0.200 | 0 | 58.9 | 48.2 | 4100 |
| *138 | Mg | 0.150 | 0.700 | 0.150 | 0 | 70.3 | 177.9 | 680 |
| *139 | Mg | 0.100 | 0.080 | 0.820 | 0 | 27.9 | −56.3 | 1000 |
| 140 | Mg | 0.100 | 0.100 | 0.800 | 0 | 31.5 | −12.5 | 13500 |
| *141 | | 0.550 | 0.450 | 0 | 0 | 45.8 | 250.8 | 1800 |
| 142 | Mg | 0.490 | 0.500 | 0.010 | 0 | 44.8 | 455 | 3900 |
| 143 | Mg | 0.350 | 0.350 | 0.300 | 0 | 36.1 | −26.5 | 7800 |
| 144 | Mg | 0.400 | 0.400 | 0.200 | 0 | 38.8 | −14.8 | 6700 |
| 145 | Mg | 0.300 | 0.500 | 0.200 | 0 | 45.5 | 16.1 | 8200 |
| 146 | Mg | 0.400 | 0.500 | 0.100 | 0 | 42.5 | 0 | 8600 |
| 147 | Co | 0.400 | 0.500 | 0.100 | 0 | 43.5 | 3.5 | 8200 |
| 148 | Zn | 0.400 | 0.500 | 0.100 | 0 | 43.5 | −3.5 | 7900 |
| 149 | Ni | 0.400 | 0.500 | 0.100 | 0 | 40.9 | 1.0 | 7600 |
| 150 | Mn | 0.400 | 0.500 | 0.100 | 0 | 43.8 | 4.5 | 6900 |
| 151 | $Mg_{1/5}Co_{1/5}Zn_{1/5}Ni_{1/5}Mn_{1/5}$ | 0.400 | 0.500 | 0.100 | 0 | 42.9 | 0.7 | 8900 |
| *152 | Mg | 0.650 | 0.250 | 0.100 | 0 | 32.3 | −4.5 | 950 |
| 153 | Mg | 0.600 | 0.300 | 0.100 | 0 | 40.1 | 5.5 | 4500 |

TABLE 4-2

| Sample No. | A | Composition (molar fraction) | | | (Value) | | | |
|---|---|---|---|---|---|---|---|---|
| | | x | y | z | w | εr | τf | Qu |
| 154 | Mg | 0.100 | 0.400 | 0.500 | 0 | 62.8 | 49.8 | 3600 |
| *155 | Mg | 0.050 | 0.450 | 0.500 | 0 | 73.4 | 135.0 | 780 |
| 156 | Mg | 0.450 | 0.350 | 0.200 | 0 | 41.5 | −9.8 | 4900 |
| 157 | Mg | 0.330 | 0.470 | 0.200 | 0 | 42.1 | −1.0 | 8700 |
| 158 | Mg | 0.330 | 0.470 | 0.200 | 0.01 | 42.1 | −0.8 | 8800 |
| 159 | Mg | 0.330 | 0.470 | 0.200 | 0.05 | 41.8 | −0.5 | 8950 |
| 160 | Mg | 0.330 | 0.470 | 0.200 | 0.20 | 41.0 | 0 | 9200 |
| 161 | Co | 0.330 | 0.470 | 0.200 | 0.20 | 40.5 | 4.6 | 8900 |
| 162 | Zn | 0.330 | 0.470 | 0.200 | 0.20 | 40.2 | −1.3 | 8700 |
| 163 | Ni | 0.330 | 0.470 | 0.200 | 0.20 | 38.4 | 6.0 | 7300 |
| 164 | Mn | 0.330 | 0.470 | 0.200 | 0.20 | 42.9 | 3.5 | 6300 |
| 165 | $Mg_{1/5}Co_{1/5}Zn_{1/5}Ni_{1/5}Mn_{1/5}$ | 0.330 | 0.470 | 0.200 | 0.20 | 41.8 | 0.9 | 9500 |
| 166 | Mg | 0.330 | 0.470 | 0.200 | 0.50 | 40.0 | 1.2 | 9830 |
| 167 | Mg | 0.330 | 0.470 | 0.200 | 1.00 | 37.8 | 4.5 | 9950 |
| *168 | Mg | 0.330 | 0.470 | 0.200 | 1.10 | 32.1 | 8.9 | 1800 |

TABLE 5-1

| Sample No. | A | Composition (molar fraction) | | | | f (G) | fQu (G) |
|---|---|---|---|---|---|---|---|
| | | x | y | z | w | | |
| *169 | | 0.410 | 0.590 | 0 | 0 | 3.82 | 40000 |
| *170 | | 0.410 | 0.590 | 0 | 0 | 1.65 | 25000 |
| *171 | | 0.410 | 0.590 | 0 | 0 | 0.79 | 8500 |
| 172 | Mg | 0.340 | 0.520 | 0.140 | 0 | 3.85 | 58500 |
| 173 | Mg | 0.340 | 0.520 | 0.140 | 0 | 1.69 | 51000 |
| 174 | Mg | 0.340 | 0.520 | 0.140 | 0 | 0.80 | 35300 |
| 175 | $Mg_{39/40}Mn_{1/40}$ | 0.340 | 0.520 | 0.140 | 0.02 | 3.84 | 60200 |
| 176 | $Mg_{39/40}Mn_{1/40}$ | 0.340 | 0.520 | 0.140 | 0.02 | 1.68 | 56100 |
| 177 | $Mg_{39/40}Mn_{1/40}$ | 0.340 | 0.520 | 0.140 | 0.02 | 0.81 | 48700 |
| 178 | Mg | 0.350 | 0.450 | 0.200 | 1.00 | 3.95 | 60000 |
| 179 | Mg | 0.350 | 0.450 | 0.200 | 1.00 | 1.72 | 54200 |
| 180 | Mg | 0.350 | 0.450 | 0.200 | 1.00 | 0.90 | 46300 |
| 181 | $Mg_{1983/2000}Mn_{17/2000}$ | 0.350 | 0.449 | 0.201 | 1.01 | 3.94 | 60000 |
| 182 | $Mg_{1983/2000}Mn_{17/2000}$ | 0.350 | 0.449 | 0.201 | 1.01 | 1.72 | 56800 |
| 183 | $Mg_{1983/2000}Mn_{17/2000}$ | 0.350 | 0.449 | 0.201 | 1.01 | 0.91 | 52500 |

TABLE 5-2

| Sample No. | A | Composition (molar fraction) | | | | f (G) | fQu (G) |
|---|---|---|---|---|---|---|---|
| | | x | y | z | w | | |
| 184 | $Co_{1983/2000}Mn_{17/2000}$ | 0.350 | 0.449 | 0.201 | 1.01 | 3.90 | 56000 |
| 185 | $Co_{1983/2000}Mn_{17/2000}$ | 0.350 | 0.449 | 0.201 | 1.01 | 1.69 | 51200 |
| 186 | $Co_{1983/2000}Mn_{17/2000}$ | 0.350 | 0.449 | 0.201 | 1.01 | 0.87 | 47200 |

TABLE 5-2-continued

| Sample No. | A | Composition (molar fraction) | | | (Value) w | f (G) | fQu (G) |
|---|---|---|---|---|---|---|---|
| | | x | y | z | | | |
| 187 | Zn<sub>1983/2000</sub>Mn<sub>17/2000</sub> | 0.350 | 0.449 | 0.201 | 1.01 | 0.88 | 46500 |
| 188 | Ni<sub>1983/2000</sub>Mn<sub>17/2000</sub> | 0.350 | 0.449 | 0.201 | 1.01 | 0.85 | 48000 |
| 189 | Mn | 0.400 | 0.500 | 0.100 | 0 | 3.83 | 51000 |
| 190 | Mn | 0.400 | 0.500 | 0.100 | 0 | 1.62 | 45000 |
| 191 | Mn | 0.400 | 0.500 | 0.100 | 0 | 0.79 | 35200 |
| 192 | Mn | 0.400 | 0.500 | 0.100 | 1.00 | 3.81 | 54100 |
| 193 | Mn | 0.400 | 0.500 | 0.100 | 1.00 | 1.62 | 45300 |
| 194 | Mn | 0.400 | 0.500 | 0.100 | 1.00 | 0.76 | 38100 |
| 195 | Mg<sub>1/5</sub>Co<sub>1/5</sub>Zn<sub>1/5</sub>Ni<sub>1/5</sub>Mn<sub>1/5</sub> | 0.400 | 0.500 | 0.100 | 0 | 0.79 | 54200 |

TABLE 6

| Sample No. | A | Composition (molar fraction) | | | (Value) w | SnO<sub>2</sub> molar (%) | f (G) | fQu (G) |
|---|---|---|---|---|---|---|---|---|
| | | x | y | z | | | | |
| *196 | | 0.400 | 0.500 | 0 | 0 | 0.10 | 9.002 | 55000 |
| *197 | | 0.400 | 0.500 | 0 | 0 | 0.10 | 4.036 | 27100 |
| *198 | | 0.400 | 0.500 | 0 | 0 | 0.10 | 1.524 | 15300 |
| 199 | | 0.400 | 0.500 | 0 | 0 | 0.10 | 0.900 | 10200 |
| 200 | Mg | 0.330 | 0.470 | 0.200 | 0 | 0 | 8.519 | 74100 |
| 201 | Mg | 0.330 | 0.470 | 0.200 | 0 | 0 | 3.884 | 51800 |
| 202 | Mg | 0.330 | 0.470 | 0.200 | 0 | 0 | 1.502 | 28100 |
| 203 | Mg | 0.330 | 0.470 | 0.200 | 0 | 0 | 0.788 | 25400 |
| 204 | Mg | 0.330 | 0.470 | 0.200 | 0.20 | 0 | 8.598 | 76200 |
| 205 | Mg | 0.330 | 0.470 | 0.200 | 0.20 | 0 | 3.942 | 57200 |
| 206 | Mg | 0.330 | 0.470 | 0.200 | 0.20 | 0 | 1.511 | 31500 |
| 207 | Mg | 0.330 | 0.470 | 0.200 | 0.20 | 0 | 0.812 | 26900 |
| 208 | Mg<sub>1/5</sub>Co<sub>1/5</sub>Zn<sub>1/5</sub>Ni<sub>1/5</sub>Mn<sub>1/5</sub> | 0.330 | 0.470 | 0.200 | 0.20 | 0 | 8.622 | 81900 |
| 209 | Mg<sub>1/5</sub>Co<sub>1/5</sub>Zn<sub>1/5</sub>Ni<sub>1/5</sub>Mn<sub>1/5</sub> | 0.330 | 0.470 | 0.200 | 0.20 | 0 | 4.098 | 63500 |
| 210 | Mg<sub>1/5</sub>Co<sub>1/5</sub>Zn<sub>1/5</sub>Ni<sub>1/5</sub>Mn<sub>1/5</sub> | 0.330 | 0.470 | 0.200 | 0.20 | 0 | 1.763 | 56200 |
| 211 | Mg<sub>1/5</sub>Co<sub>1/5</sub>Zn<sub>1/5</sub>Ni<sub>1/5</sub>Mn<sub>1/5</sub> | 0.330 | 0.470 | 0.200 | 0.20 | 0 | 0.903 | 48100 |

What is claimed is:

1. A dielectric ceramic comprising as the main component a complex oxide formed of both Zr and Ti, at least one component selected from the group (A) consisting of Mg, Co, Zn, Ni and Mn and at least one component selected from the group (B) consisting of Nb and Ta, said main component comprising a $ZrTiO_4$ phase substituted with at least one component of group (A) and at least one component of group (B), or the main component has a crystal structure comprising a $ZrTiO_4$ phase substituted with at least one component of group (A) and at least one component of group (B), wherein the molar fraction ratio of the total amount of group (A) to the total amount of group (B) is from 0.5 to 1.0.

2. A dielectric ceramic composition expressed by Formula (a):

$$xZrO_2-yTiO_2-zA_{(1+w)/3}Nb_{(2-w)/3}O_2 \qquad (a)$$

wherein A denotes at least one component selected from the group (A) consisting of Mg, Co, Zn, Ni and Mn, x, y and z denote molar fractions ranging from 0.10 to 0.60, 0.20 to 0.60 and 0.01 to 0.70, respectively, and have the relation represented by Formula ($\alpha$):

$$x+y+z=1 \qquad (\alpha)$$

and w denotes a value of 0 to 1.50.

3. A dielectric ceramic composition expressed by Formula (b):

$$xZrO_2-yTiO_2-zA_{(1+w)/3}Ta_{(2-w)/3}O_2 \qquad (b)$$

wherein A denotes at least one component selected from the group (A) consisting of Mg, Co, Zn, Ni and Mn, x, y and z denote molar fractions ranging from 0.10 to 0.60, 0.10 to 0.60 and 0.01 to 0.80, respectively, and have the relation represented by Formula ($\alpha$):

$$x+y+z=1 \qquad (\alpha)$$

and w denotes a value of 0 to 1.00.

* * * * *